(12) United States Patent
Shah (10) Patent No.: US 6,478,233 B1
(45) Date of Patent: Nov. 12, 2002

(54) THERMAL COMFORT CONTROLLER HAVING AN INTEGRAL ENERGY SAVINGS ESTIMATOR

(75) Inventor: Dipak J. Shah, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/751,730

(22) Filed: Dec. 29, 2000

(51) Int. Cl.⁷ .................. G05B 13/02; G05D 23/00
(52) U.S. Cl. .................. 236/46 R; 236/47; 236/94; 700/36
(58) Field of Search .................. 236/47, 46 R, 236/91 R, 91 D, 94; 62/126; 165/111.1; 700/36

(56) References Cited

U.S. PATENT DOCUMENTS

| 4,685,615 A | * | 8/1987 | Hart ........................... 236/94 |
| 5,192,020 A | | 3/1993 | Shah ....................... 236/46 R |
| 5,555,927 A | | 9/1996 | Shah ........................ 165/239 |
| 5,717,609 A | * | 2/1998 | Packa et al. ............... 165/11.1 |

* cited by examiner

Primary Examiner—William Wayner
(74) Attorney, Agent, or Firm—Kris T. Fredrick (57) ABSTRACT

A thermal comfort controller using various recovery methods to change the indoor temperature to meet set points in a setup/setback schedule to maintain thermal comfort for occupants of an enclosure. The thermal comfort controller further comprising an apparatus to determine the expected energy savings when modifying the setup/setback schedule for the enclosure in which the temperature controller is used. The energy savings information may be displayed to the enclosure occupant for further consideration.

19 Claims, 4 Drawing Sheets

THERMAL COMFORT CONTROLLER HAVING AN INTEGRAL ENERGY SAVINGS ESTIMATOR

FIELD OF THE INVENTION

The present invention relates to thermostats and other thermal comfort controllers. The present invention particularly relates to thermostats having energy saving estimation capabilities which also use adaptive intelligent temperature recovery.

BACKGROUND OF THE INVENTION

In traditional thermal comfort control systems, a thermostat initiates heating system operation when the temperature falls below the set point value. The heating system responds by injecting heated air into the enclosure until the temperature within the enclosure has risen to a point above the set point value. In order to achieve more accurate temperature control, typical thermostats use an anticipation element so as to turn off the heating system before the actual set point is achieved. This anticipation causes the actual air temperature for the enclosure to be more accurately controlled at the desired set point. For many situations this type of control results in air temperature that is comfortable for the enclosure's occupants. The above described principles of traditional thermal comfort control are equally applicable to a cooling system, except that the anticipation function works in reverse, i.e., the anticipator initiates operation of the cooling plant before the set point temperature is exceeded.

With the development of programmable thermostats, occupants are able to modify the temperature within the enclosure at predetermined time periods. Occupants can program the thermostat to follow a temperature set point schedule. For example, thermostats may be programmed to an energy saving condition (setback temperature in heating or setup temperature in cooling) and a comfort condition (setup temperature in heating or setback temperature in cooling). Typically, the thermostat is set to control the temperature at the comfort conditions when the occupants are awake or generally occupy the enclosure. Conversely, the thermostat can control the temperature at energy saving conditions when occupants leave the enclosure and when occupants go to sleep.

The use of setback/setup schedules is known to provide energy savings in many situations. However, conventional programmable thermostats do not provide any information regarding how much energy is actually saved, or how much energy could be saved if the occupant were to modify the temperature set point setup/setback features. Estimates of expected energy savings using the setup/setback features have typically been inferred from tabulated data which is more than 20 years old. The tabulated data was typically based on the generic building constructions from the 1970s which had over-sized HVAC equipment. Because no two building constructions are identical in terms of occupancy, operation, and HVAC equipment sizes and installations, the anticipated energy savings due to setup/setback will be different for each application. The differences are magnified due to various factors such as internal loads, infiltration and exfiltration, solar gains, and the like.

Today, buildings are designed and constructed taking energy conservation measures into consideration. Installed HVAC equipment is much more critically sized to meet the building heating and cooling loads at design conditions, and therefore does not have excess capacity.

Moreover, modern thermostats, such as The Perfect Climate Comfort Controller, Model Nos. PC/W-89xx, and Chronotherm IV, Model Nos. T86xx, manufactured by Honeywell International, Inc., use the tabulated data for energy savings estimates which is based on the assumption that the temperature set point changes from the energy savings value to the comfort value at the programmed time, and not any earlier. Yet, these modern thermostats have incorporated Adaptive Intelligent Recovery (AIR) algorithms. The AIR algorithms provide the thermostat with more efficient heating and cooling system operation that starts the heating/cooling system before the desired time so that the actual temperature meets the desired set point temperature at the specified set point time, rather than the thermostat starting the system at the set point time.

In view of the above, it is apparent that there is a need to provide a climate control system that provides a user with information regarding actual energy consumption for specific enclosures, and accurate estimation of the energy savings for the enclosure if the setup/setback features of a programmable thermostat are modified.

SUMMARY OF THE INVENTION

In view of the foregoing, it is an object of the present invention to provide a thermostat that can determine the expected energy savings from temperature set point setup/setback for the building in which the thermostat is used. This thermostat also provides control of an indoor climate to intelligently change temperature according to a predetermined set point setup/setback schedule such that the thermal comfort of the occupants is maintained.

A further object of the invention is to display the expected energy savings information to the enclosure occupant.

In one embodiment of the present invention, the enclosure set point schedule is preprogrammed into the thermostat, including the temperature set points, both at the comfort condition and at the energy saving conditions (setup/setback). This schedule also includes the times of day at which the temperature set points are changed. The system further obtains the outdoor air temperature through the use of an outdoor air temperature sensor. An estimate of the potential energy savings from the programmed setup/setback schedule is then determined for the enclosure. This energy savings is based on the known characteristics of the enclosure and the HVAC equipment in operation. This energy savings information is then presented to the enclosure occupant.

Additionally, the system allows the occupant to modify the temperature schedule, and receive similar information regarding potential energy savings resulting from this modification. For example, an alternative or proposed setup/setback schedule can be input by the occupant. Based on this alternative schedule, the system of the present invention can provide an indication to the user of the amount of energy savings to be expected. The occupant can then determine whether it is desirable to modify the temperature schedule, based upon the estimated energy savings and a desired comfort level.

A further object of the invention is to provide an indication to the user of the amount of energy savings to be expected for a proposed change in single temperature set point operation.

These and other objects not specifically enumerated herein are believed to be addressed by the present invention which contemplates a controller for a climate control system that has an integral energy savings estimator.

DETAILED DESCRIPTION OF THE INVENTION

The description contained herein relates to the specific structures of a controller for a heating/cooling system, as presently contemplated. This description, however, is intended to be illustrative only and not limiting as to the scope of the present invention. For example, while the invention will be described in the context of a thermostat, the invention is applicable to a variety of climate control systems as well. Furthermore, while the invention is described for the heating mode of operation, the invention is equally applicable in the cooling mode of operation with the understanding that in the cooling mode of operation, the energy saving set point temperature is higher than the comfort set point temperature, and vice versa in the heating mode.

Figure 1:
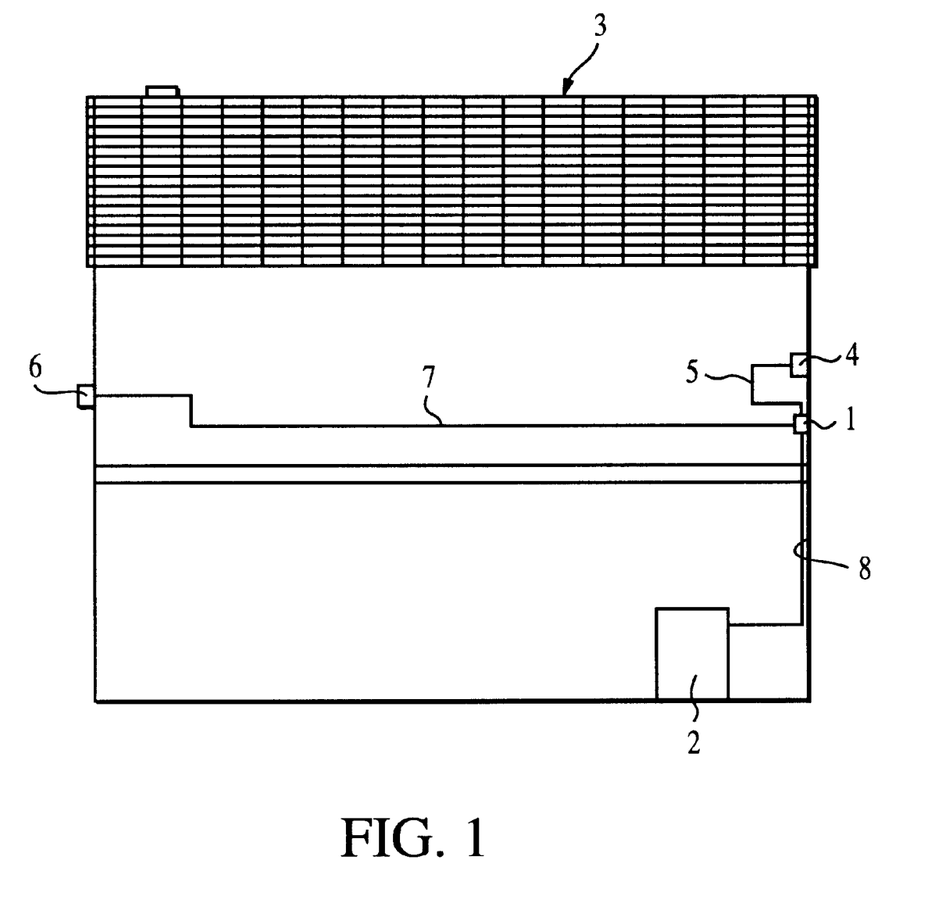
FIG. 1 is a graphical representation of the present invention in an enclosure.

As shown in FIG. 1, a thermostat 1 controls a heating/cooling system 2 (i.e., furnace, air conditioner, heat pump, or the like) to intelligently change temperature set points (setup/setback) to maintain thermal comfort for the occupants of an enclosure 3. The control of the heating/cooling system is represented by line 8. An indoor sensor 4 is operatively attached to thermostat 1, the connection represented by line 5, for supplying the indoor dry-bulb temperature. An outdoor sensor 6 is operatively attached to thermostat 1, the connection represented by line 7, for supplying the outdoor dry-bulb temperature.

Figure 2:
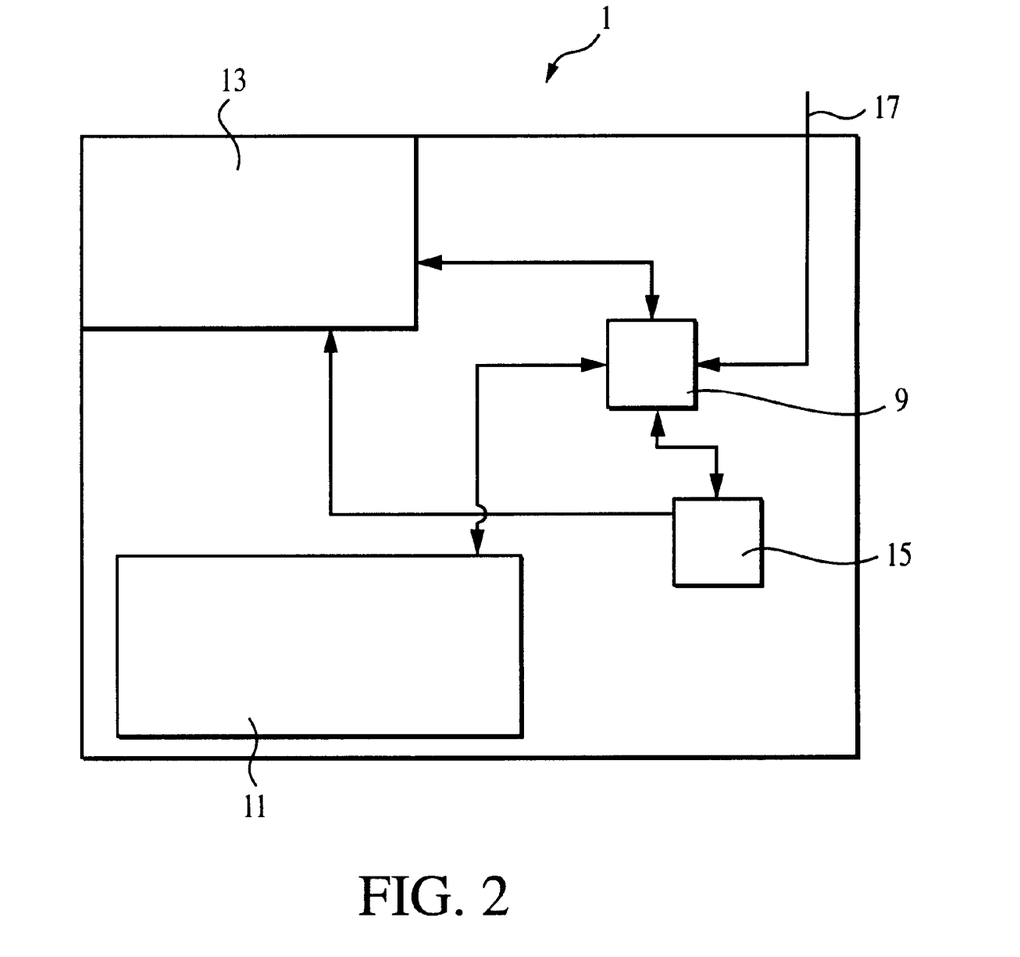
FIG. 2 is a schematic of present invention.

As shown in FIG. 2, the thermal comfort controller of the present invention, thermostat 1, comprises a controller or memory 9 operatively connected to a user input source 11 and a user display 13. The user input 11 is preferably a keypad, but may be a touch screen, or have remote access capability for a PC, PDA, or the like. Display 13 is preferably a LCD display, however, the display may be of any type. The memory/controller 9 is operatively connected (represented by line 17) to indoor sensor 4 and outdoor sensor 6. A calculator 15, operatively connected to emory 9, determines the expected energy savings between a predetermined temperature set point in a setup/setback schedule and a proposed new temperature set point schedule for the enclosure in which the thermostat is used. The energy savings information is displayed on display 13 to the enclosure occupant for further consideration.

Figure 3:
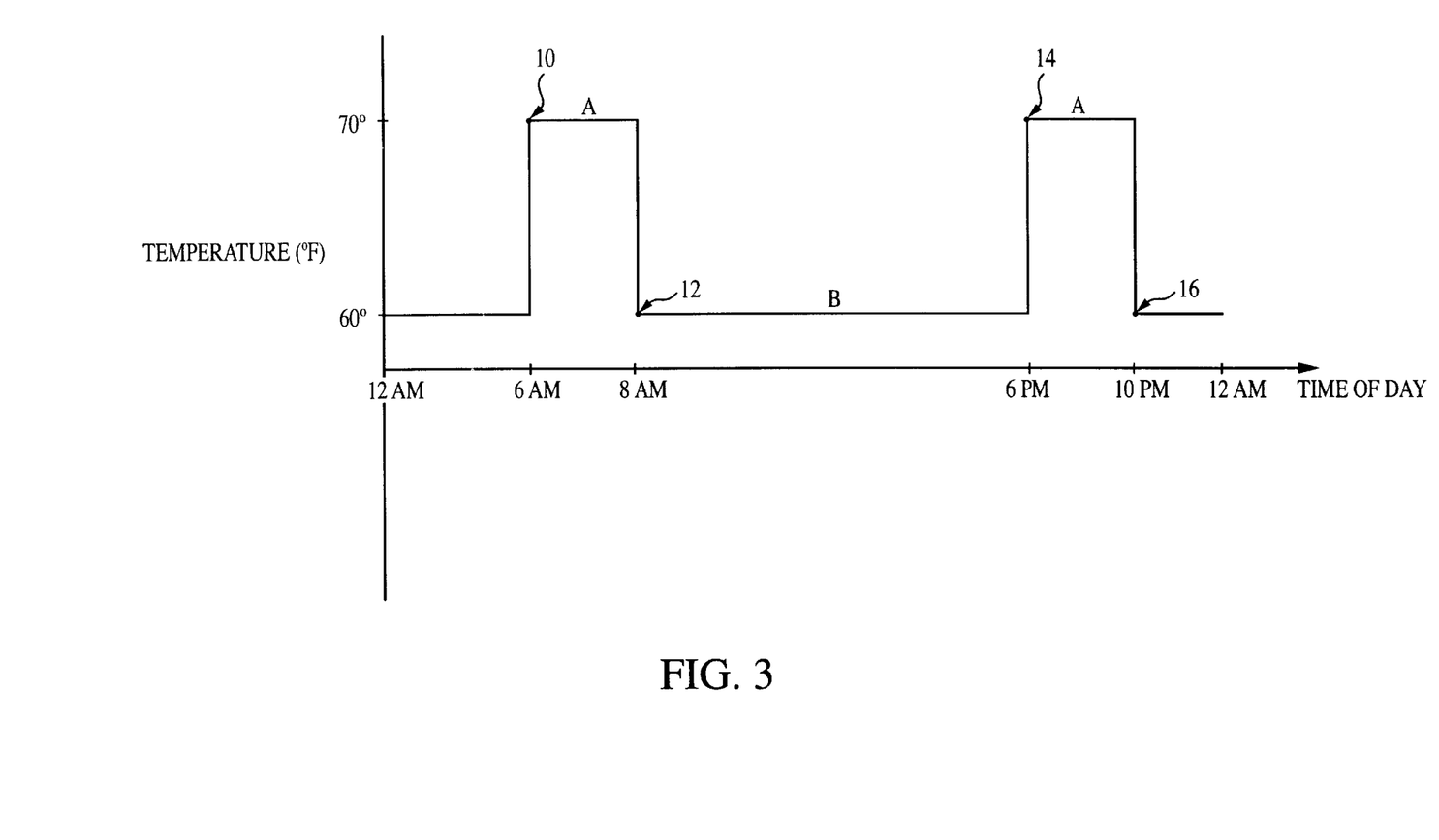
FIG. 3 is a graphical representation of a conventional setup/setback feature.

As shown in FIG. 3, the heating mode setup/setback feature on a programmable thermostat permits a user to select a comfort condition A and an energy savings condition B. Note that comfort condition A in the morning may be the same as or different from that in the evening, and also note that the energy saving condition B during the daytime hours may be the same as or different from that during the night through early morning hours. Additionally, the thermostat can have multiple and different comfort and energy saving set point temperatures (i.e., setup/setback schedules) even though FIG. 3 depicts only two of the many possible scenarios. The user may select a set point temperature 10 at a predetermined time, e.g., 70 degrees Fahrenheit at occupant's wakeup time of 6 a.m. The user selects the duration of the comfort condition A, typically until the occupants leave. Another time is selected for the beginning of the energy savings condition B, and the set point temperature for the setback 12, e.g., 60 degrees Fahrenheit at 8 a.m. The energy savings condition continues until another preselected setup temperature set point 14 arrives. For example, the time occupants return to the enclosure at 6 p.m. and selected comfort condition A of 70 degrees Fahrenheit, which is to be maintained until they go to sleep 16 at 10 p.m.

Adaptive Intelligent Recovery (AIR) is a process involving a series of algorithms used to determine the precise time to activate the climate control system (i.e., heating or cooling system) to change the enclosure temperature from the energy saving condition to the comfort condition. Using these AIR algorithms, the actual heating and cooling system start times are altered to allow the enclosure to reach the desired temperature at the desired time. Through this process, the thermostat can develop knowledge about the enclosure. For example, the thermostat learns the enclosure temperature ramp rates that the heating/cooling system is capable of providing. Also, the thermostat can determine certain information about the thermal characteristics of the structure (e.g., thermal time constant, thermal loss).

Most significantly, AIR algorithms cause the heating/cooling system to operate differently than was done with previous thermostats. Consequently, all of the previously mentioned data regarding energy savings is not applicable.

Figure 4:
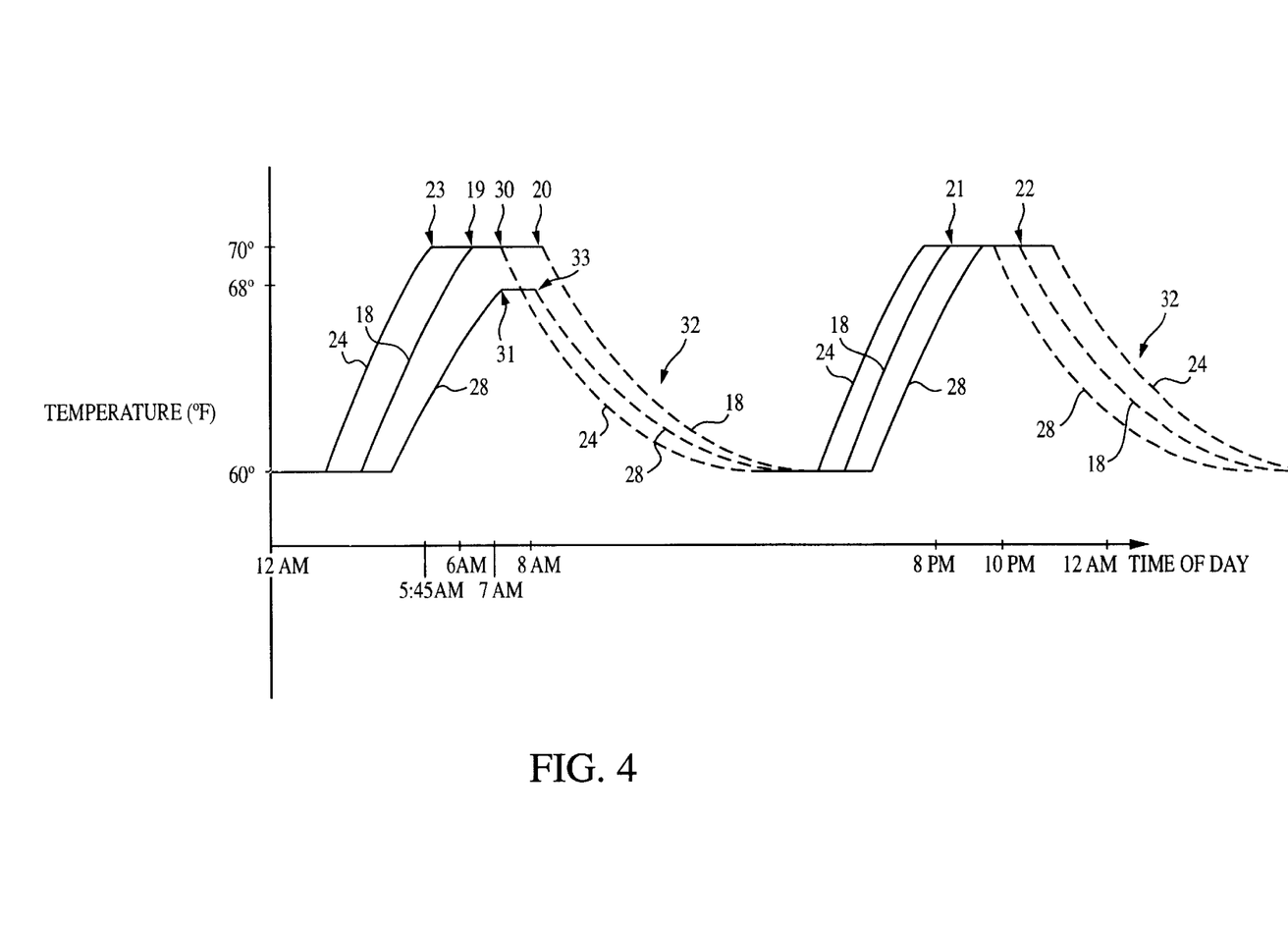
FIG. 4 is a graphical representation of a recovery start times of a thermostat using adaptive intelligent recovery.

The climate control system user may want to obtain information relating to energy savings if the heating mode setup/setback schedule is modified, as shown in FIG. 4. It should be noted that although FIG. 4 and the following associated description depicts a scenario for the heating mode of operation, the discussion is equally applicable for the cooling mode of operation wherein the energy saving set point temperature is typically higher than the comfort set point temperature. The original enclosure temperature response profile 18 for the heating mode has a comfort condition set point 19 of 70 degrees Fahrenheit at 6 a.m. The comfort condition has a two hour duration, ending 20 at 8 a.m. The set point temperature setback process 32 begins at 8 a.m., bringing the enclosure to the energy savings condition. The climate control system then begins recovery to the next comfort condition 21 that begins at 8 p.m. and ends 22 at 10 p.m. The setback period again begins at 10 p.m. to return to the energy savings condition.

However, the occupant may want to modify the setup/setback schedule to have a schedule 24 with a different comfort condition set point start time 23, such as 5:45 a.m., with a decreased duration of only a one hour fifteen minutes, ending 30 at 7 a.m. The present invention provides a thermostat with the ability to present the enclosure occupant with a percentage of energy savings estimate for the proposed schedule modification.

Alternatively, occupant may desire to modify the setup/setback schedule by changing the comfort condition start time and temperature 28. With a later comfort condition starting time 31 of 7 a.m., a lower set point temperature of 68 degrees Fahrenheit, and one hour comfort condition duration ending 33 at 8 a.m., the present invention provides the occupant with an energy savings estimate for such a modified setup/setback schedule.

The calculator of the present invention may also determine the actual amount of energy saved by modifying the setup/setback schedule from a previous temperature set point(s) to the current temperature set point(s). Alternatively, the calculator may determine the amount of expected energy savings to be expected for a single temperature set point modification.

For programmable thermostats that use set point temperature setup/setback schedules for ensuring comfort conditions and saving energy, the preprogrammed time, the recovery ramp rate and duration of the recovery period are available within the thermostat logic as described in U.S. Pat. Nos. 5,555,927 and 5,192,020, both of which are incorporated herein by reference. The data on the recovery ramp rate and duration of the recovery period, in conjunction with the availability of the enclosure space temperature set points both at the comfort condition and at the energy savings setup/setback conditions, the times of the day at which the temperature set points are changed, and the outdoor air temperature from an outdoor air temperature sensor may all be used to determine the potential energy savings from setup/setback for an enclosure and HVAC equipment being controlled by the thermostat.

The data from the thermostat logic may be applied in several ways to determine the energy savings. Two approaches are described herein. Note that the temperature values are presented for a climate control system operating in the heating mode. The algorithms are equally applicable for a climate control system operating in the cooling mode.

In a preferred embodiment, an energy balance on an enclosure results in the following equation for the time rate of change of the sensed enclosure temperature:

$$mc_p \frac{dT_s}{dt} = q - UA(T_s - T_{oa}) \text{ or,} \tag{1}$$

$$\frac{mc_p}{UA} = \frac{q}{UAdT_s/dt} - \frac{T_s - T_{oa}}{dT_s/dt} \tag{2}$$

where:
  $mc_p$=Overall thermal capacity of the enclosure,
  q=Time rate of heat input into the enclosure from a heating or cooling device,
  $T_s$=Sensed enclosure temperature at time t,
  $T_{oa}$=Outdoor air temperature at time t, and
  UA=Overall heat transfer coefficient of the system.

In equation (2), the ratio of the overall thermal capacity of the enclosure, $mc_p$, to the overall heat transfer coefficient of the system, UA, is commonly known as the overall thermal time constant of the system, $\tau_s$, which is expressed as:

$$\tau_s = \frac{mc_p}{UA} \tag{3}$$

Those skilled in the art will note that once a thermal system has been defined, its thermal time constant, as defined by equation (3), will not vary significantly on a daily basis, nor between two consecutive days in particular. However, it should be noted that since the thermal and heat transfer properties of any material could vary with its temperature, the thermal system's time constant during the low cold temperatures of the winter months could conceivably be different than during the higher warmer temperatures of the summer months. Those skilled in the art will note that the heat transfer coefficient, UA, will be different during the winter months than during the summer months, and that the heat transfer coefficient is also influenced by wind speed, wind direction, and many other factors.

Substituting equation (3) into equation (2), one obtains:

$$\tau_s = \frac{q}{UAdT_s/dt} - \frac{T_s - T_{oa}}{dT_s/dt} \tag{4}$$

Equation (4) permits the determination of the thermal time constant when the heating/cooling system is turned OFF, i.e., q=0, thusly:

$$\tau_s = -\frac{T_s - T_{oa}}{dT_s/dt} \tag{5}$$

Equation (1) can be re-written as:

$$q = mc_p \frac{dT_s}{dt} + UA(T_s - T_{oa}) \text{ or,} \tag{6}$$

$$\frac{q}{UA} = \frac{mc_p}{UA}\frac{dT}{dt} + (T_s - T_{oa}) \text{ or,}$$

$$\frac{q}{UA} = \tau_s \frac{dT_s}{dt} + (T_s - T_{oa})$$

Equation (6) can be used to determine the instantaneous amount of energy required, q, to maintain the enclosure at a set point temperature $T_{sp}$. One then integrates equation (6) over a period of time, for example, 24 hours, to compute the total amount of energy required to maintain the enclosure at the set point temperature $T_{sp1}$ for that period of time, and then again integrates equation (6) over the same period of time to compute the total amount of energy required to maintain the enclosure at a different set point temperature $T_{sp2}$. The results of these two integration process, when ratioed, will provide an indication of the expected energy saving between two different set point temperatures. In the case of where setup/setback schedules are used in thermostats to maintain the enclosure at different set point temperatures at different times of day, equation (6) can be integrated to determine the amount of energy required to maintain the enclosure at the different set point temperature values, and also to determine the amount of energy required to recover from energy savings set point temperature value to comfort set point temperature value.

In order to correctly determine, by integration, the total amount of energy required to maintain the enclosure at the energy savings set point temperature value, one needs to know the time at which the enclosure temperature will have reached the energy saving set point temperature value from the comfort set point temperature value. This is accomplished by monitoring the time rate of change of the enclosure temperature and recording the time at which the enclosure temperature equals the energy saving set point temperature. Note, that in order to correctly determine the total amount of energy required for maintaining the enclosure at a set point temperature, the integration should not be done during periods when the heating/cooling system is OFF, i.e., the instantaneous amount of energy required, q, equals zero. Alternatively, a value of zero could be integrated into the total energy calculation whenever the heating/cooling system is OFF.

The above identified equations and methodology may be used to estimate the total amount of energy required to maintain an enclosure at any setup/setback schedule. The computation for different setup/setback schedules can then be compared to determine the approximate amount of energy savings that may be expected between alternatives.

In another embodiment, the percentage of energy savings is determined as follows. A conditioned enclosure is being maintained at a dry-bulb temperature $T_1$ which is higher than the outside temperature $T_0$, to which the conditioned enclosure is exposed. The rate of heat loss from inside to the outside is given by:

$$Q_1 = UA(T_1 - T_0) \tag{7}$$

Where:

$Q_1$ is the rate of heat loss from inside to outside when the indoor dry-bulb temperature is $T_1$ U is overall U-value of the structure exposed to the outside temperature $T_0$ A is the area of the structure exposed to the outside temperature $T_0$.

The inside/enclosure temperature $T_1$ and the outside temperature $T_0$ are provided by operatively attached sensors. The U-value and the area of the structure exposed to the outside temperature may be entered into the thermostat.

When the thermal comfort controller used for maintaining the enclosure dry bulb temperature $T_1$ is reset to a new energy saving value $T_2$, which is lower than $T_1$ in the heating mode, then the new and reduced rate of heat loss from the inside to the outside is given by:

$$Q_2 = UA(T_2 - T_0) \tag{8}$$

Where $Q_2$ is the rate of heat loss from inside to outside, when the inside dry-bulb temperature is $T_2$.

Because $T_2$ is less than $T_1$ and all other parameters are the same, the fraction of energy savings probable by maintaining the enclosure at an energy saving temperature $T_2$ lower than temperature $T_1$ is given by:

$$1 - \frac{Q_2}{Q_1} \tag{9}$$

Substituting equations (7) and (8) for $Q_1$ and $Q_2$, respectively, $$1 - \frac{Q_2}{Q_1} = 1 - \frac{UA(T_2 - T_0)}{UA(T_1 - T_0)} = 1 - \frac{(T_2 - T_0)}{(T_1 - T_0)} \text{ or,} \tag{10}$$

$$1 - \frac{Q_2}{Q_1} = \frac{(T_1 - T_2)}{(T_1 - T_0)}$$

Therefore, if the conditioned enclosure is always maintained at a comfort dry-bulb temperature of $T_1$, then for any fixed or variable outdoor temperature $T_0$, the occupant can determine the potential energy savings, if the enclosure were permitted to operate at an energy savings dry-bulb temperature $T_2$ by using equation (10):

$$\frac{(T_1 - T_2)}{(T_1 - T_0)} \tag{11}$$

to obtain the fraction of energy savings, or using:

$$\frac{(T_1 - T_2)}{(T_1 - T_0)} \times 100 \tag{12}$$

to give the percentage of potential energy savings.

The percentage of potential energy savings may be disclosed to the occupant by graphical display on the thermostat, printed out on an attachable printer, or the like. Additionally, the energy savings estimator may be used for diagnostic functions. The occupant may maintain a running estimate of potential energy uses and/or savings to determine the energy efficiency of the enclosure. The running estimate may indicate something is wrong with the enclosure, such as a leak in the building structure, or the like. The diagnostic functions, as well as the energy savings estimation, may be transferred or maintained by remote access with a standalone PC or PDA.

Alternatively, where a time varying profile is available for any of the dry-bulb temperatures $T_1$, $T_2$, and $T_0$, the calculations could be done for each time step in the setup/setback schedule, and then arithmetically manipulated (e.g. integrated, averaged, or the like) to obtain the average energy savings.

Additionally, the energy savings estimation may be done for a thermostat that does not have AIR algorithms.

Although the invention has been described in terms of particular embodiments and applications one of ordinary skill in the art, in light of this teaching, can generate additional embodiments and modifications without departing from the spirit of or exceeding the scope of the claimed invention. Accordingly, it is to be understood that the drawings and descriptions herein are proper by way of example to facilitate comprehension of the invention and should not be construed to limit the scope thereof.

What is claimed is:

1. An apparatus for cooperating with a thermal comfort controller having an indoor temperature sensor providing an indoor temperature signal encoding an indoor dry-bulb temperature, and which controls the operation of a climate control system to maintain an indoor temperature based upon a preprogrammed setup/setback schedule, the apparatus for further providing an accurate estimate of energy savings, said apparatus comprising:

an outdoor temperature sensor providing an outdoor temperature signal encoding an outdoor dry-bulb temperature; and a calculator receiving an indoor temperature signal from the indoor temperature sensor which encodes the indoor temperature and the outdoor temperature signal, the preprogrammed setup/setback schedule from a thermal comfort controller memory, and a second indoor temperature set point from the thermal comfort controller, for computing a potential energy savings if the thermal comfort controller uses the second indoor temperature.

2. The apparatus of claim 1, wherein the second indoor temperature is entered at the thermal comfort controller.

3. The apparatus of claim 1, wherein the climate control system is any one of the group consisting of a furnace, air conditioner, heat pump, and fan coil unit.

4. An apparatus for cooperating with a thermal comfort controller having an indoor temperature sensor, a user display, and which controls the operation of a climate control system to maintain an indoor temperature based upon a preprogrammed setup/setback schedule, the apparatus for further providing an accurate estimate of energy savings, said apparatus comprising:

an outdoor temperature sensor providing an outdoor temperature signal encoding an outdoor temperature;

a calculator receiving an indoor temperature signal from the indoor temperature sensor which encodes the indoor temperature and the outdoor temperature signal, the preprogrammed setup/setback schedule from a thermal comfort controller memory, and another setup/setback schedule from the thermal comfort controller, wherein both setup/setback schedules comprise at least one indoor temperature set point, for computing an amount of energy savings if the thermal comfort controller uses the said another setup/setback schedule;

wherein the amount of energy savings is determined by:
determining the amount of energy required to maintain the enclosure at said at least one indoor temperature set point for both setup/setback schedules;
determining the amount of energy required to recover from an energy savings set point temperature to the sensed indoor temperature;
determining the amount of energy required to recover from an energy savings set point temperature to said at least one indoor temperature set point of said another setup/setback schedule; and
comparing the amount of energy required to maintain the enclosure at both setup/setback schedules, and the amount of energy required to recover from an energy savings set point temperature to the sensed indoor temperature and to said at least one indoor temperature set point in said another setup/setback schedule; and wherein the amount of energy savings is displayed on the thermal comfort controller display.

5. An apparatus for cooperating with a thermal comfort controller having an indoor temperature sensor, a user display, and which controls the operation of a climate control system to maintain an indoor temperature based upon a preprogrammed setup/setback schedule, the apparatus for further providing an accurate estimate of energy savings, said apparatus comprising:

an outdoor temperature sensor providing an outdoor temperature signal encoding an outdoor dry-bulb temperature;

a calculator receiving an indoor temperature signal from the indoor temperature sensor which encodes the indoor temperature and the outdoor temperature signal, the preprogrammed setup/setback schedule from a thermal comfort controller memory, and a second indoor temperature from the thermal comfort controller, for computing a percentage of potential energy savings if the thermal comfort controller uses the second indoor temperature;

wherein the percentage energy savings is determined by a first value determined by the first indoor dry-bulb temperature minus the second indoor temperature, the first value divided by a second value determined by the first indoor dry-bulb temperature minus the outdoor dry-bulb temperature, and the resulting fraction multiplied by 100;

and wherein the percentage of energy savings is displayed on the thermal comfort controller display.

6. A thermal comfort controller, including:

an outdoor temperature sensor providing an outdoor temperature signal encoding an outdoor dry-bulb temperature;

an indoor temperature sensor providing an indoor temperature signal encoding an indoor dry-bulb temperature value;

a memory storing a preprogrammed setup/setback schedule and a new indoor temperature set point entered into said thermal comfort controller; and a calculator receiving the indoor and outdoor temperature signals, the preprogrammed setup/setback schedule and entered new indoor temperature set point for computing a percentage of potential energy savings using the second indoor temperature.

7. A thermostat comprising:

an outdoor temperature sensor providing an outdoor temperature signal encoding an outdoor temperature;

an indoor temperature sensor providing an indoor air temperature signal encoding an indoor temperature value; and a calculator receiving the indoor and outdoor air temperature signals, an entered preprogrammed setup/setback schedule and an entered indoor temperature, for computing a potential energy savings using the entered indoor temperature.

8. The thermostat of claim 7, wherein the preprogrammed setup/setback schedule and entered indoor temperature are stored in a memory in the thermostat.

9. The thermostat of claim 8, wherein the entered indoor temperature is input into the thermostat by a user.

10. The thermostat of claim 7, further comprising a display for presentation of the computed potential energy savings.

11. The apparatus of claim 7, wherein the thermostat is operatively attached to any one of the group consisting of a furnace, air conditioner, heat pump, and fan coil unit.

12. A method of estimating the amount energy saved by a modification of a setup/setback schedule of a thermostat controlling the temperature within a structure, comprising:

providing a preprogrammed setup/setback schedule;
sensing a indoor temperature;
sensing an outdoor temperature;
entering a proposal indoor temperature;
calculating the energy savings; and
presenting the energy savings to a thermostat user.

13. The method of claim 12, wherein the energy savings is calculated by:

determining a first value by the indoor temperature minus said proposed indoor temperature;
determining a fraction by the first value divided by a second value determined by the indoor temperature minus the outdoor temperature; and
multiplying the fraction by 100.

14. The method of claim 12, wherein the energy savings is calculated by:

determining the amount of energy required to maintain the enclosure at the sensed indoor temperature and at said proposed indoor temperature;
determining the amount of energy required to recover from an energy savings set point temperature to the sensed indoor temperature;
determining the amount of energy required to recover from an energy savings set point temperature to said another indoor temperature; and
comparing the amount of energy required to maintain the enclosure at the sensed indoor temperature and another indoor temperature, and the amount of energy required to recover from an energy savings set point temperature to the sensed indoor temperature and another indoor temperature.

15. The method of claim 12, further comprising calculating the energy savings for a plurality of proposed indoor temperatures.

16. The method of claim 12 wherein the step of calculating the energy savings comprises comparing the heat loss for the structure at the preprogrammed indoor temperature and the proposed indoor temperature.

17. The method of claim 12 wherein the step of calculating the energy savings comprises calculating the amount of energy required to maintain the structure at the preprogrammed indoor temperature and calculating the amount of energy required to maintain the structure at the proposed indoor temperature, and comparing the two energy calculations to determine energy savings.

18. The method of claim 17 wherein the calculations of energy is accomplished over predetermined periods of time.

19. The method of claim 12 wherein the proposed indoor temperature includes a proposed indoor setup/setback schedule.

* * * * *